United States Patent [19]

Akagi

[11] Patent Number: 4,482,952
[45] Date of Patent: Nov. 13, 1984

[54] VIRTUAL ADDRESSING SYSTEM USING PAGE FIELD COMPARISONS TO SELECTIVELY VALIDATE CACHE BUFFER DATA ON READ MAIN MEMORY DATA

[75] Inventor: Masanobu Akagi, Tokyo, Japan

[73] Assignee: Nippon Electric Co., Ltd., Tokyo, Japan

[21] Appl. No.: 328,774

[22] Filed: Dec. 8, 1981

[30] Foreign Application Priority Data

Dec. 15, 1980 [JP] Japan .................. 55-176974
Jan. 9, 1981 [JP] Japan .................. 56-1939

[51] Int. Cl.³ .................. G06F 9/26; G06F 13/00
[52] U.S. Cl. .................. 364/200
[58] Field of Search ... 364/200 MS File, 900 MS File

[56] References Cited

U.S. PATENT DOCUMENTS

| | | | |
|---|---|---|---|
| 3,902,163 | 8/1975 | Amdahl et al. | 364/200 |
| 3,938,100 | 2/1976 | Steiner | 364/200 |
| 4,084,230 | 4/1978 | Matick | 364/200 |
| 4,130,867 | 12/1978 | Bachman et al. | 364/200 |
| 4,218,743 | 8/1980 | Hoffman et al. | 364/200 |
| 4,277,826 | 7/1981 | Collins et al. | 364/200 |
| 4,373,179 | 2/1983 | Katsumata | 364/200 |
| 4,400,700 | 8/1983 | Chan et al. | 364/200 |

Primary Examiner—James D. Thomas
Assistant Examiner—A. E. Williams, Jr.
Attorney, Agent, or Firm—Sughrue, Mion, Zinn, Macpeak & Seas

[57] ABSTRACT

A buffer memory system comprises a buffer memory and a fetch directory. Both are accessible by a concatenation of at least the least significant bit of logical or physical page field of a logical or a physical address signal and a selected number of bits lower than that least significant bit. Physical page fields stored in the fetch directory are used to control an access to a data block stored in the buffer memory even at a plurality of addresses accessible by logical and physical address signals for one and the same instruction for accessing the memory. The system may or may not comprise an inverse translation table for translating a physical address signal for accessing a main memory into the concatenation to be used in accessing the buffer memory and the control table.

9 Claims, 14 Drawing Figures

PAD

AAD

VIRTUAL ADDRESSING SYSTEM USING PAGE FIELD COMPARISONS TO SELECTIVELY VALIDATE CACHE BUFFER DATA ON READ MAIN MEMORY DATA

BACKGROUND OF THE INVENTION

This invention relates to a buffer memory system for use in a data processing system. The data processing system may be what is called a digital electronic computer system.

In general, a computer system comprises a central processor and a main memory. Programs and data for use in data processing, are stored in the main memory as entries or contents thereof. For an increased number of entries, the main memory must have a large memory capacity. Among others, the time required to access the main memory becomes longer.

In order to shorten the access time and thereby to raise the speed of data processing, a buffer memory of a smaller memory capacity is used in storing information of a greater frequency of use. The information is given by copies of the entries in the main memory. The central processor directly accesses the buffer memory at first for desired entries. Only when the desired entries are not found in the buffer memory, the central processor accesses the main memory and stores the accessed entries in the buffer memory.

The programs are often fragmented into a plurality of program blocks. Transfer of the program blocks or movement of blocks of information between the main and the buffer memories, is called "paging" in the art.

When the art of paging in resorted to, it is unnecessary for each user of the computer system to direct attention to the relation between the memory capacity of the main memory and the length of the program for the user and to the manner of fragmentation of the program. A physical (real) address is automatically derived from a logical (virtual) address specified by the programmer for the program.

With the concept of logical addresses in mind, a translation storage system is disclosed by David W. Anderson et al, assignors to International Business Machines Corporation, in a United States patent application filed June 30, 1971, and matured into U.S. Pat. No. 3,761,881. The Anderson et al system comprises a buffer memory, a translation look aside table for retaining current logical-to-physical address translations, and a buffer directory for accessing the buffer memory with physical addresses. Each logical address comprises a virtual portion and a real displacement which is common to a physical address and is representative of an address in a page of the buffer memory. Although the Anderson et al system has worked admirably, the number of addresses in a page is restricted and can be increased only by an increase in the bulkiness of hardware.

An improved memory system is revealed by Joseph A. Alvarez et al, assignors to International Business Machines Corporation, in a United States patent application filed Jan. 20, 1972, and issued as U.S. Pat. No. 3,723,976. According to Alvarez et al, each of a plurality of buffer memories in a memory system is accompanied by a fetch directory or control table and a broadcast store directory or auxiliary directory. The control table is for accessing the accompanying buffer memory at first. When the requested information is not found in the accompanying buffer memory, the control table accesses the auxiliary directories. The Alvarez et al system is excellent in avoiding the bulkiness of hardware. The system is, however, still defective in that the requested information is obtained from the buffer memories in two ways, one directly from the accompanying one and the other from one of the other buffer memories. The access time therefore increases when the information is present in one of the other buffer memories. Furthermore, complicated control for the two ways, is unavoidable.

SUMMARY OF THE INVENTION

It is therefore an object of the present invention to provide a buffer memory system of a relatively large memory capacity and yet accessible with a shortest possible access time.

It is another object of this invention to provide a buffer memory of the type described, in which control is simple.

According to this invention, there is provided a buffer memory system for use in a data processing system comprising a main memory and address signal producing means for producing a general address signal given in one of logical and physical forms for each of a plurality of instructions for accessing the main memory and comprising a first, a second, and a third field at higher order bits, at least one intermediate bit, and lower order bits, respectively. The general address signal given in the logical form for one of the instructions, has a logical page field for specifying one of a plurality of pages. The general address signal given in the physical form for the above-described one instruction, has a physical page field for specifying the aforementioned one page. Each of the logical and the physical page fields comprises the first and the second fields. The third field of a general address signal comprising each of the logical and the physical page fields mentioned above, is for specifying one of a plurality of block addresses in the afore-mentioned one page. The main memory has main memory addresses for storing a data block in the main memory address accessible by the page and the block address specified by a general address signal given in the physical form. The buffer memory system comprises address translating means, translation table means, buffer memory means, control table means, and first through fifth means.

The address translating means is for translating the logical page field of a general address signal given for each instruction to the physical page field of a general address signal given for the instruction under consideration.

The translation table means has translation table addresses, each accessible by the first and the second fields of a general address signal given in either of the logical and the physical forms for a particular instruction for memorizing the physical page field of a general address signal given in the physical form for the particular instruction.

The buffer memory means has buffer memory addresses, each accessible by the second and the third fields of a general address signal given in either of the logical and the physical forms for a specific instruction for memorizing a copy of the data block stored in the main memory address accessible by the page and the block address specified by a general address signal given in the physical form for the specific instruction.

The control table means has control table addresses, each accessible by the second and the third fields of a general address signal given in either of the logical and the physical forms for the specific instruction for memorizing the physical page field of the general address signal given in the physical form for the specific instruction.

The first means is responsive to the first and the second fields of a general address signal currently produced by the address signal producing means in either of the logical and the physical forms for reading the physical page field from the translation table means and responsive to the second and the third fields of the currently produced general address signal for reading the data block from the buffer memory means and the physical page field from the control table means.

The second means is for comparing one of the physical page field of the currently produced general address signal and the physical page field read from the translation table means with the physical page field read from the control table means to produce a comparison result signal indicative of whether the compared physical page fields are in coincidence or incoincidence with each other.

The third means is responsive to the comparison result signal for judging that the block data read from the buffer memory means is effective only when the comparison result signal is indicative of the coincidence.

The fourth means is responsive to the comparison result signal indicative of the incoincidence for reading the data block from the main memory address accessible by the third field of the currently produced general address signal and that pertinent one of the physical page fields read from the translation table means and of the currently produced general address signal according as the currently produced general address signal is given in the logical and the physical forms.

The fifth means is for making the buffer memory address accessible by the second and the third fields of the currently produced general address signal memorize the data block read from the main memory and for making the control table address accessible by the second and the third fields of the currently produced general address signal memorize the pertinent one of the physical page fields.

Other objects of this invention and the technical merits thereby achieved, will become clear as the description proceeds.

DESCRIPTION OF THE PREFERRED EMBODIMENTS

Figure 1:
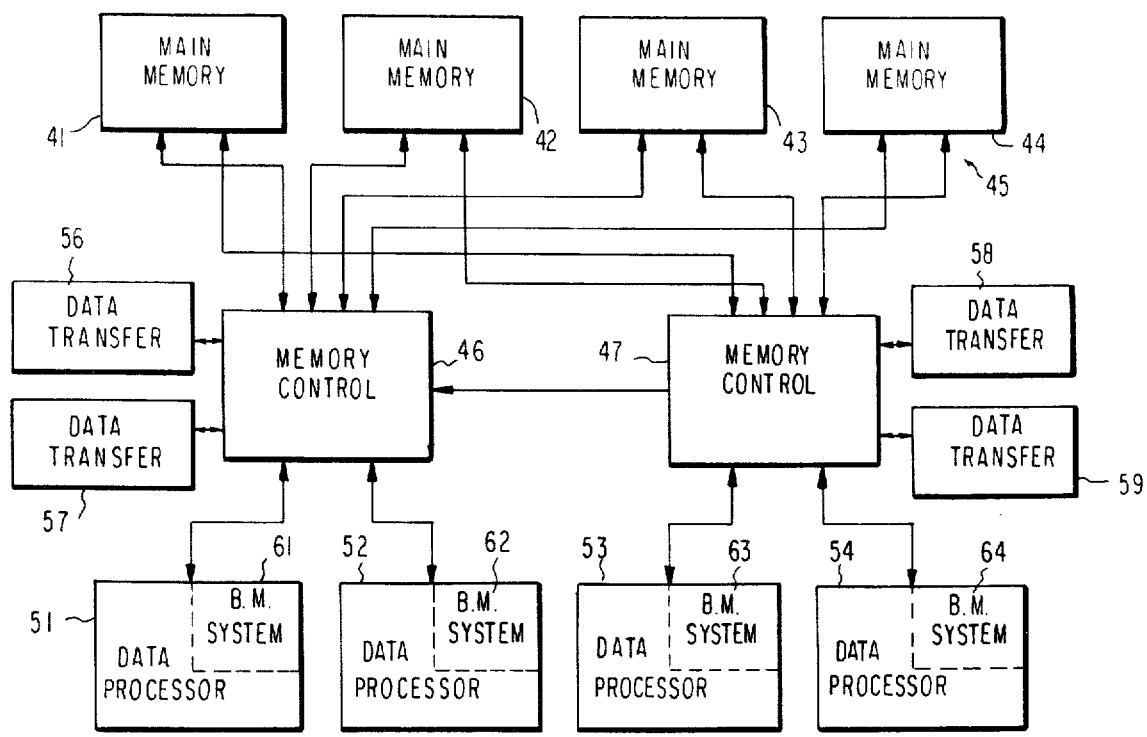
FIG. 1 is a block diagram of a data processing system to which the instant invention is applicable.
Figure 2:
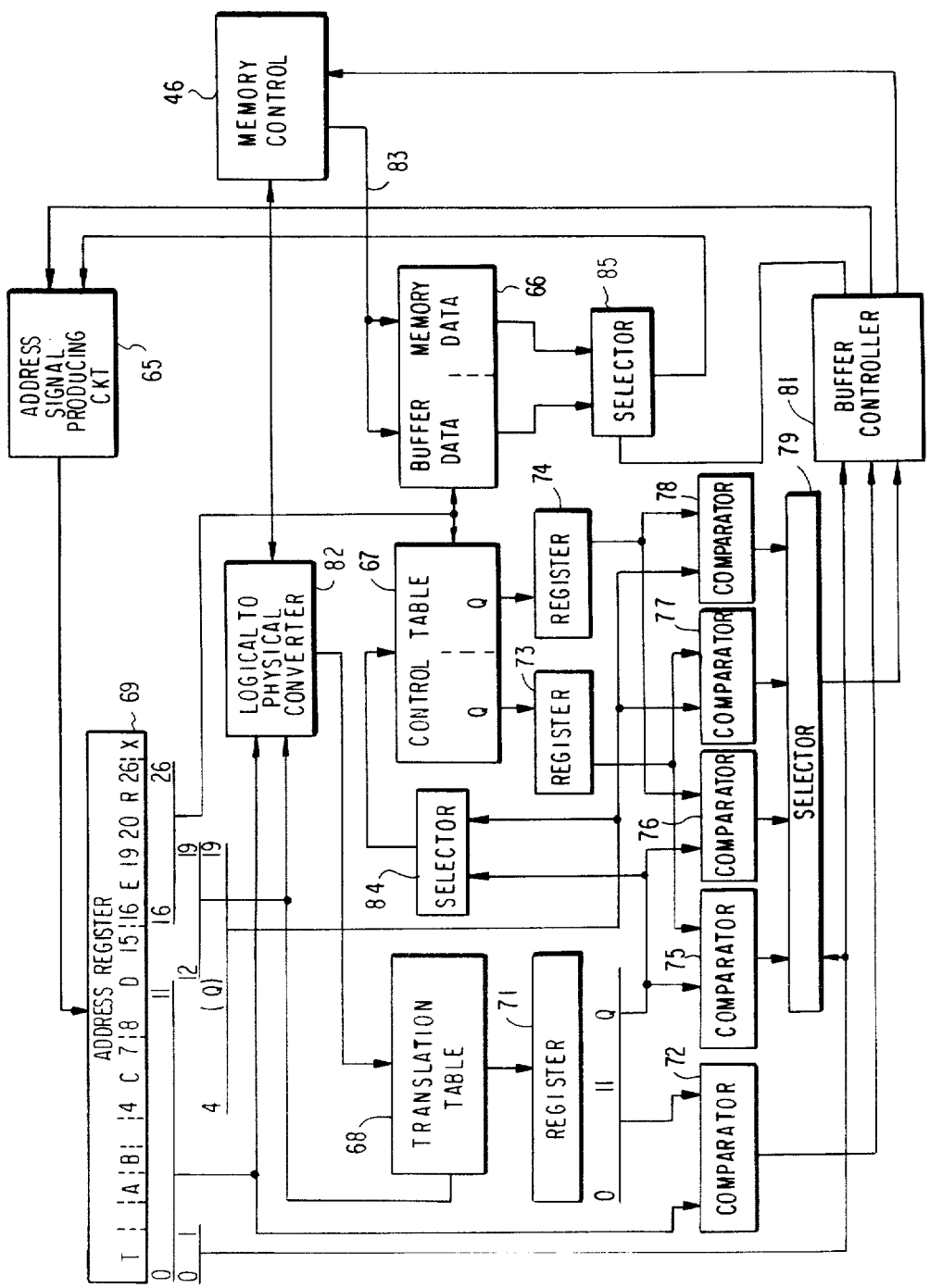
FIG. 2 shows in blocks a buffer memory system according to a first embodiment of this invention, together with a memory control unit and an address signal producing unit of the data processing system depicted in FIG. 1.

Referring at first to FIG. 1, a data processing system to which the present invention is applicable, is similar to that described in the above-referenced Alvarez et al patent with reference to FIG. 2 thereof. The data processing system comprises a plurality of main memories 41, 42, 43, and 44, which will collectively referred to as a main memory 45. A plurality of memory control units 46 and 47 are connected to each other and to the main memory 45. A plurality of data processors 51 and 52 are connected to one of the memory control units 46 and 47. Another plurality of data processors 53 and 54 are connected to the other of the memory control units 46 and 47. A plurality of data transfer units 56, 57, 58, and 59 are likewise connected to the memory control units 46 and 47. The data processors 51 through 54 are inclusive of buffer memory systems or blocks 61, 62, 63, and 64, respectively. General description of the data processing system of the structure being illustrated, is known in the art. Operation specifically related to a buffer memory system according to this invention will later be described.

Referring now to FIG. 2, a buffer memory system according to a first embodiment of this invention, is coupled to one of the memory control units, such as 46. An address signal producing unit 65 included in one of the data processors, such as 51, supplies the buffer memory system with a general address signal to be presently described. In the manner known in the art, the address signal producing unit 65 produces such a general address signal in compliance with an instruction for primarily accessing the main memory 45 either for storage of a data block therein or fetch of a data block therefrom. The data block may be a block of commands for carrying out the data processing.

Figure 3:
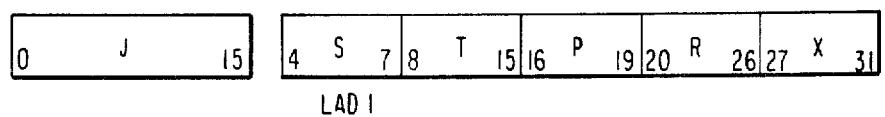
FIG. 3 shows a few address formats used in the buffer memory system illustrated in FIG. 2.
Figure 3:
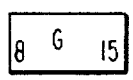
Figure 3:
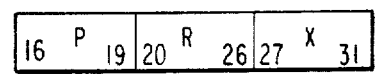
Figure 3:
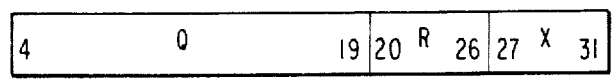
Figure 3:
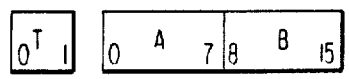
Figure 3:
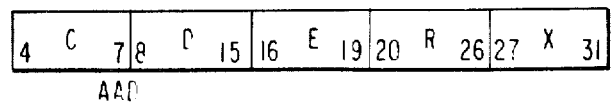

The buffer memory system comprises a buffer memory 66, a control table 67, and a translation table 68 corresponding to the cache 200, fetch directory 210, and translation directory 220 described in the above-cited Alvarez et al patent with reference to FIG. 3 thereof, respectively. As described by Alvarez et al, each of the buffer memory 66 and the control table 67 has a left and a right segment partitioned in the figure by a short dashed line. By way of example, each segment of the buffer memory 66 has 64K bytes, where K represents $2^{10}$ or 1,024.

Turning to FIG. 3, the general address signal represents any one, at a time, of three forms or types of addresses consisting of a first logical address LAD1, a second logical address LAD2, and a physical address PAD. It is possible to understand that the three forms are collectively given as a general address AAD, which may variously be called, such as a pseudo address or an assumption address. Each address is specified by a plurality of bits, such as sixty-four bits, which are usually renumbered a few times in the art from a zeroth bit 0 to a bit of a certain number in a descending order from the most significant bit to the least significant bit. The general address AAD has a type field T of the zeroth and the first bits 0 and 1 indicative of one of the three types at a time. A and B fields are given by renumbered zeroth through seventh bits 0 to 7 and eighth through fifteenth bits 8 to 15, respectively. C, D, and E fields are given by twice renumbered fourth through seventh bits 4 to 7, eighth through fifteenth bits 8 to 15, and sixteenth through ninteenth bits 16 to 19, respectively. A block field R and a byte field X are given by the twice renumbered twentieth through twenty-sixth bits 20 to 26 and twenty-seventh through thirty-first bits 27 to 31, respectively. For the buffer memory system being illustrated, each address has a first, a second, and a third field in the descending order. The first through the third fields consist of the twice renumbered twelfth through fifteenth bits 12 to 15, sixteenth through ninteenth bits 16 to 19, and twentieth through twenty-sixth bits 20 to 26, respectively.

Figure 4:
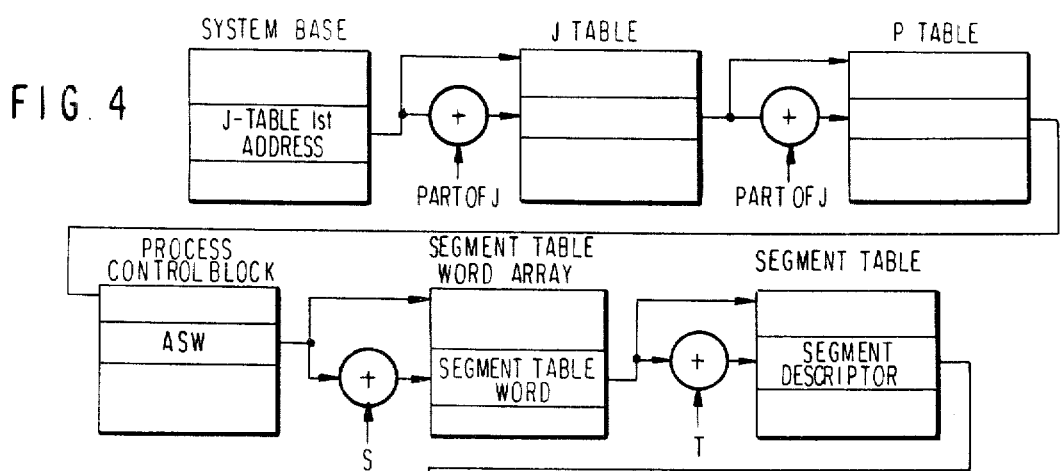
FIG. 4 is a diagram for describing generation of a block address from an address signal given in a first logical form.

Referring to FIG. 3 more in detail and to FIG. 4 in addition to FIG. 3, the first logical address LAD1 comprises a J field given by the A and the B fields for use in specifying a software process. The J field comprises a portion for specifying in a system base a first (base) address in a J table. A part of the J field is added to the J-table first address as a displacement to designate a content of the J table. Another part of the J field is added to the content to likewise specify a content of a P table. The latter content specifies a word ASW in a process control block. The word ASW is indicative of an address space and specifies a first address of the process in a segment table word array.

The first logical address LAD1 comprises an S field given by the C field and representative of a segment class. The S field is added as a displacement to the word-array first address to specify a segment table word in the word array. The segment table word specifies a first address in a segment table. The first logical address LAD1 further comprises a T field (the same reference letter being used) given by the D field and representative of a segment number in the segment class. The T field is added to the segment table word to designate a segment descriptor in the segment table.

The segment descriptor is indicative of a segment in a page table. The first logical address LAD1 comprises a page field P given by the E field and representative of an address in the segment as a page number. The page field P is added as a displacement to the segment descriptor to specify a first address representative of a page descriptor in the page table. The page descriptor specifies a page by its first address. The J through the P fields are herein referred to as a logical page field, which thus specifies one of a plurality of pages.

The first logical address LAD1 comprises the block and the byte fields R and X. The block field R represents one of a plurality of block addresses or numbers in the page and is added to the page descriptor to specify a data block in the page. The byte field X is representative of a byte or data address in the block address to specify a datum in the data block.

Figure 5:
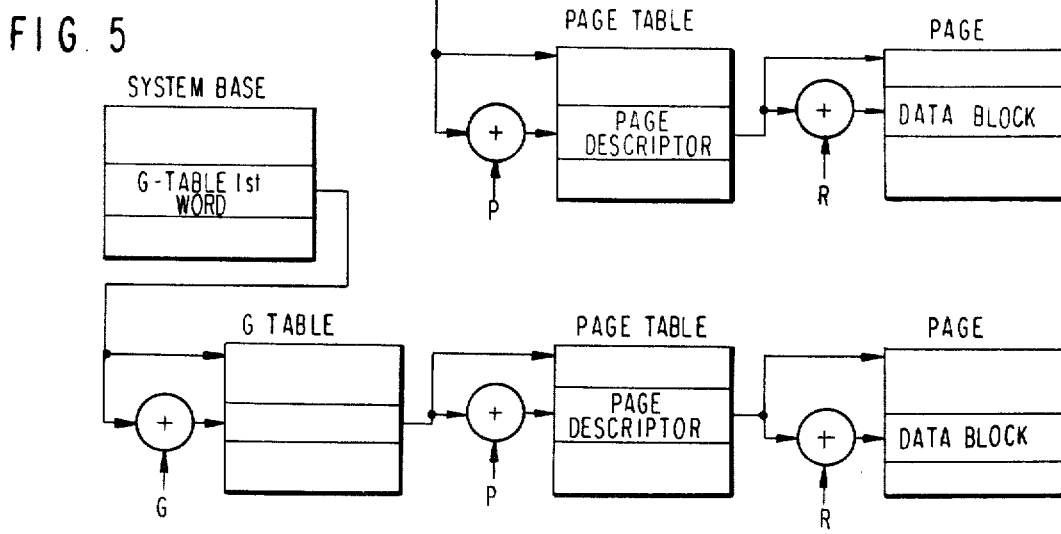
FIG. 5 is a diagram for describing formation of a block address from an address signal given in a second logical form.

Referring to FIG. 5 in addition to FIG. 3, the second logical address LAD2 is for providing an access specific to the system. The system base specifies a first address of a G table and comprises a G field given by the B field and indicative of a system segment number, which is added to the G-table first address to designate a content in the G table. The content specifies a first address in the page table. The second logical address LAD2 further comprises a page field P given by the E field for specifying a page. The G and the P fields are collectively called a logical page field.

The second logical address LAD2 comprises the block and the byte fields R and X, both similar to the corresponding fields in the first logical address LAD1. In the second logical address LAD2, the first field is given by dummy bits preceding the page field P.

As depicted in FIG. 3, the physical address PAD comprises a Q field given by the C through the E fields and incitavie of a page. The Q field is therefore named a physical page field. The physical address PAD further comprises the block and the byte fields R and X, both similar to the corresponding fields in either of the first and the second logical addresses LAD1 and LAD2.

The block and the byte fields R and X are common to all types of address. Irrespective of the address forms, the fields R and X of addresses of any two or more types are representative of the same values, respectively, on accessing one and the same datum.

Figure 6:
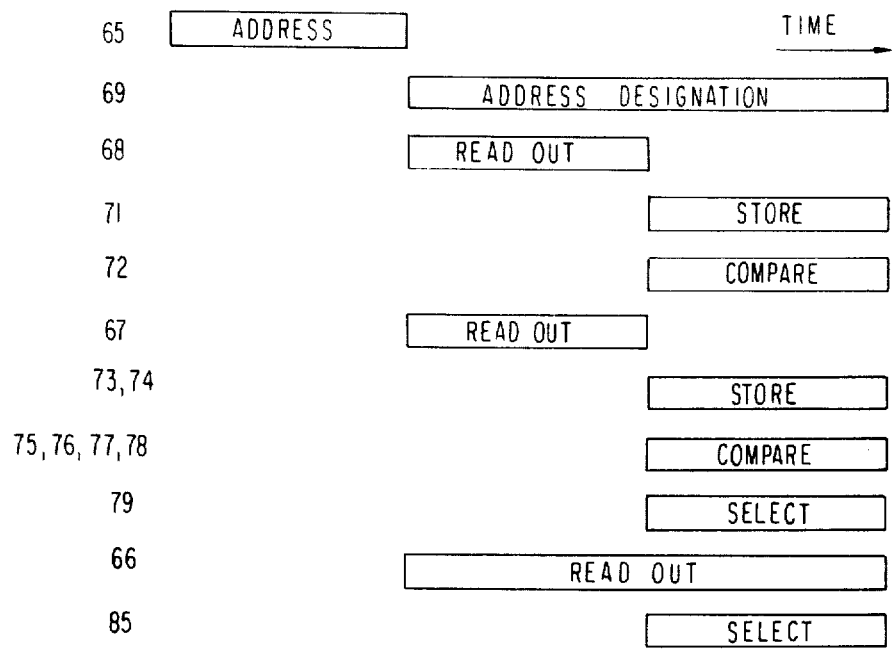
FIG. 6 is a timing chart for use in describing operation of the buffer memory system illustrated in FIG. 2.

Turning back to FIG. 2 and referring anew to FIG. 6, a general address signal currently produced by the address signal producing unit 65 as depicted in FIG. 6 at 65, is delivered to an address register 69 comprising first through third register sections for storing the type field T, the A and the B fields, and the C through the X fields, respectively. As illustrated in FIG. 6 at 69, the address register 69 designates an address in the translation table 68 by the first and the second fields of the twice renumbered twelfth through ninteenth bits 12 to 19 and an address in each of the buffer memory 66 and the control table 67 by the second and the third fields of the twice renumbered sixteenth through twenty-sixth bits 16 to 26.

A check information piece given by the zeroth bit 0 through the twice renumbered eleventh bit 11 of one of the first and the second logical addresses LAD1 and LAD2 and the physical page field Q of a physical address PAD recently obtained as an equivalent to the one logical address LAD1 or LAD2 as will later be described, are loaded in the translation table 68 at an address accessible by the first and the second fields of the currently produced address signal. In other words, the translation table 68 has a plurality of addresses, each accessible by the first and the second fields of a general address signal given in either of the logical and the physical forms for a particular instruction for memorizing the physical page field of a general address signal given in the physical form for the particular instruction. It is possible to understand that, inasmuch as accessed by the twice renumbered twelfth through ninteeth bits 12 to 19, namely, the lower order bits of the logical page field of a general address signal given in the logical form, the translation table 68 is for translating the logical page field to the physical page field of an equivalent general address signal given in the physical form. The translation is insured as will shortly be described.

The check information and the corresponding physical page field Q are read out of the translation table 68 as shown in FIG. 6 at 68 and stored, as indicated at 71, in a translation register 71 accompanying the translation table 68. As depicted in FIG. 6 at 72, a check information comparator 72 is for comparing the check information stored in the translation register 71 with the check information registered in the address register 69 to produce a result signal indicative of coincidence and incoincidence of the compared information bit patterns.

At an address accessible by the second and the third fields of the general address signal registered in the address register 69, the left and the right segments of the buffer control table 67 are usually loaded with physical page fields Q of two physical addresses PAD, respectively. Responsive to a control table access, the physical page fields Q are read out of the segments as shown in FIG. 6 at 67 and stored, as illustrated at 73 and 74, in control left and right out registers 73 and 74. As shown in FIG. 6 at 75 and 76, logical left and right comparators 75 and 76 are for comparing the contents of the control left and right out registers 73 and 74 with the physical page field Q stored in the translation register 71. As similarly shown at 77 and 78, physical left and right comparators 77 and 78 are for comparing the contents of the control left and right out registers 73 and 74 with those C through E fields stored in the address register 69, a concatenation of which gives the physical page field Q when the currently produced general address signal is given in the physical form. The comparators 75 through 78 thus produce comparison result signals indicative of whether the compared contents are in coincidence or incoincidence with each other.

A comparison result selector 79 is controlled by the type field T stored in the address register 69. As depicted in FIG. 6 at 79, the selector 79 selects the comparison result signal produced by either of the logical left and right comparators 75 and 76 when the type field T indicates that the general address signal is representative of a logical address LAD1 or LAD2. The selector 79 selects the comparison result signal produced by either of the physical left and right comparators 77 and 78 when the general address signal is indicative of a physical address PAD according to the indication of the type field T. The selector 79 produces the respectively selected comparison result signals. More specifically, a first of the selected comparison result signal is indicative of whether the physical page field Q of the general address signal given in the physical form is in coincidence or incoincidence with a particular address at which a data block recently swapped out of the main memory 45 or to be immediately swapped therein as will later be described, is stored in either of the left and the right segments of the buffer memory 66. A second of the selected comparison result signal is indicative of whether a physical page field Q equivalent to the logical page field of the general address signal given in the logical form to represent either of the first and the second logical addresses LAD1 and LAD2, is in coincidence or incoincidence with the particular address. In any event, it is possible to understand that a comparing unit comprising the comparators 75 through 78 and the selector 79 is for comparing one of the physical page field Q of the general address signal given in the physical form and registered in the address register 69 and the physical page field Q read from the translation table 68 in response to the general address signal given in the logical form and registered in the address register 69, with the physical page field Q read from the control table 67 to produce a comparison result signal indicative of whether the compared physical page fields Q are in coincidence or incoincidence with each other.

The accessed address of the translation table 68 may not necessarily be loaded with the check information which is in coincidence with the check information of the general address signal given to represent either of the logical addresses LAD1 and LAD2 and registered in the address register 69. A buffer controller 81, to be later described in detail, is informed of this event together with the type field T stored in the address register 69. Through the memory control unit 46, the buffer controller 81 makes a logical-to-physical address converter 82 convert the logical address LAD1 or LAD2 to an equivalent physical address PAD. The logical page field given by the check information and the first and the second fields of the logical address LAD1 or LAD2, is translated into a corresponding physical page field. The converter 82 supplies the check information and the equivalent physical page field Q to the translation table 68, which stores the supplied information at the address accessible by the first and the second fields under consideration.

Let it now be assumed that the general address signal stored in the address register 69 gives a physical address PAD and that the comparison result signal produced by either of the physical left and right comparators 77 and 78 is nevertheless indicative of the incoincidence. Alternatively, let it be assumed that the result signal produced by the check information comparator 72 is representative of the coincidence and that the comparison result signal produced by either of the logical left and right comparators 75 and 76 is nevertheless indicative of the incoincidence. Under the circumstances, it is confirmed that the requested data block is not preliminarily stored in the buffer memory 66. Supplied additionally with the comparison result signals from the physical and the logical comparators 75 through 78 through the comparison result selector 79, the buffer controller 81 makes the memory control unit 46 swap the requested data block out of the main memory 45 into the buffer memory 66 through a bus 83.

The requested data block is substituted in the buffer memory 66 for a previous data block, if any, at the address accessed by the second and the third fields of the general address signal registered in the address register 69 and given in either of the logical and the physical forms. Controlled by the type field T stored in the address register 69 through a connection not shown merely for simplicity of illustration, a physical page field selector 84 selects the C through the E fields of the general address signal stored in the address register 69 and the physical page field Q stored in the translation register 71 when the type field T indicates that the general address signal is given in the physical and the logical forms, respectively. The selected information gives the physical page field Q for the address accessed in the main memory 45. The selected physical page field Q is stored in the control table 67 at the accessed address.

Responsive to a buffer memory access provided by the second and the third fields of the general address signal stored in the address register 69, the buffer memory 66 delivers the entries of the left and the right segments to a buffer memory selector 85 as depicted in FIG. 6 at 66. When a comparison result signal is supplied from one of the left comparators 75 and 77 and from one of the right comparators 76 and 78 through the comparison result selector 79, the buffer controller 81 supplies a selection signal to the buffer memory selector 85 to make the same select the entries in the left and the right segments, respectively, as the requested data block as shown in FIG. 6 at 85. The selected data block is delivered to the data processor 51 represented in FIG. 2 by the address signal producing unit 65.

It is now understood that the logical-to-physical address converter 82 serves as an address translating unit for translating the logical page field of a general address signal given in the logical form for an instruction, to the physical page field Q of a general address signal given in the physical form for that instruction. The buffer memory 66 has addresses, each accessible by the second and the third fields of a general address signal given in either of the logical and the physical forms for a specific instruction for memorizing a copy of the data block stored in the main memory 45 at an address accessible by the page and the block address specified by a general address signal given in the physical form for the specific instruction. The control table 67 has addresses, each accessible by the second and the third fields of a general address signal given in either of the logical and the physical forms for the specific instruction for memorizing the physical page field Q of the general address signal given in the physical form for the specific instruction. Responsive to the first and the second fields of a general address signal currently produced by the address signal producing unit 65 in either of the logical and the physical forms, the physical page field Q is read from the translation table 68. Responsive to the second and the third fields of the currently produced general address signal, the data block is read from the buffer memory 66 while the physical page field Q is read from the control table 67. It is not mandatory to use the translation register 71 and the control left and right out registers 73 and 74.

When the comparison result signal is indicative of the coincidence, the data block read from the buffer memory 66 is judged to be a true requested data block, namely, to be effective. In the event that the comparison result signal is indicative of the incoincidence, the true requested data block is read from the main memory 45 by the physical page field Q read from the translation table 68 and the third field R of the currently produced general address signal given in the logic form or by the physical page field Q and the third field R of the currently produced general address signal given in the physical form. The buffer memory 66 is made to memorize the data block read from the main memory 45. The control table 67 is made to memorize the physical page field Q either read from the translation table 67 or of the currently produced general address signal.

Figure 7:
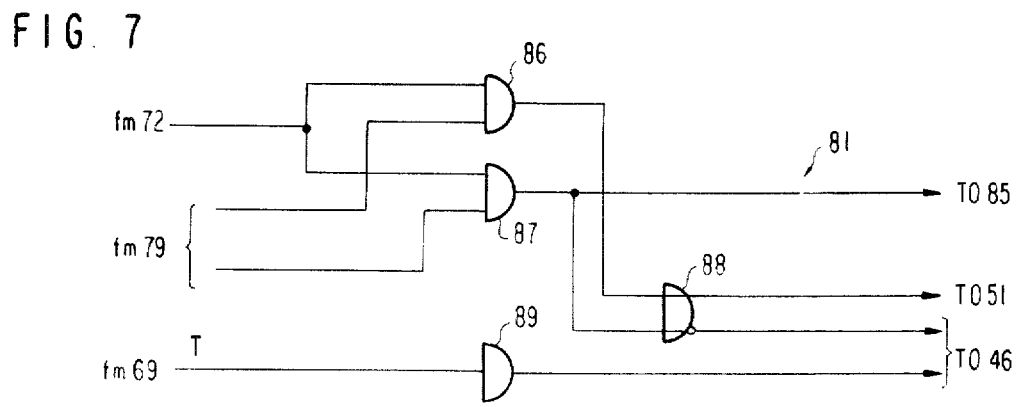
FIG. 7 is a circuit diagram of a buffer control unit for use in the buffer memory system shown in FIG. 2.

Turning now to FIG. 7, the buffer controller 81 may comprise first and second two-input AND gates 86 and 87 supplied in common with the result signal from the check information comparator 72 and with the comparison result signals from the comparison result selector 79 for supplying the selection signal to the buffer memory selector 85. An output signal of either of the AND gates 86 and 87 is supplied also to the data processor 51 represented in FIG. 2 as the address signal producing unit 65, as a true output signal of a two-input OR gate 88 to indicate the fact that the data block selected by the buffer memory selector 85 is effective. A complementary output signal of the OR gate 88 is supplied to the memory control unit 46 together with the type field T registered in the address register 69 and supplied thereto through a third AND gate 89 to request swap out of the requested data block from the main memory 45 into the buffer memory 66.

It may be that the requested data block is already stored in the buffer memory 66 at another address even when neither of the logical and the physical comparators 75 through 78 produces a comparison result signal indicative of the coincidence. The other addresses are not searched for, by reviewing other physical page fields Q stored in the control table 67. This scheme is resorted to, in order to simplify the control. It is readily feasible in theory to access one and the same physical address by different logical addresses. The scheme is nevertheless preferred because the software is usually contemplated so that such an access seldom occurs when seen on the hardware level. More particularly, the above-described architecture is such that the data block for a physical address is memorized in a plurality of those addresses of the buffer memory 66 which are in one-to-one correspondence to different instructions. The data block is, however, seldom memorized in a plurality of addresses in practice. The scheme therefore does not materially reduce the memory capacity of the buffer memory 66.

The control table 67 is accessed by the second and the third fields, namely, not only by the block field R but also by the E field that is included in the physical page field Q memorized in the control table 67. As pointed out heretobefore, the address information is given the same value for a particular instruction at the block field R and the lower order bits. The E field, for which another part of the type field T through the E field may be substituted, is used in accessing the control table 67 and also as a part of the physical page field Q memorized therein. This enables the buffer memory 66 to have an apparently larger memory capacity. In addition, the physical page field Q includes other information given by the higher order bits than the block field. This makes it possible to insure the judgement as regards presence and absence of the requested data block in the buffer memory 66.

The buffer memory 66 is accessible by those fields of the address information which comprise the block field R common to all address forms and the E field (which may be another part of the type field T through the E field) and which are specific to the page and the block address. The buffer memory 66 is controlled only by the physical page field Q in effect. The control is carried out so that the same data block may be memorized in the buffer memory 66 at different addresses if the control table 67 is accessed by general address signals which are different from each other even at a part and yet indicative of the same physical address and so that the buffer memory addresses are understood to be the same for general address signals which have a common part and are indicative of the same physical address. The same data block is thus memorized in the buffer memory 66 even at a plurality of addresses. A buffer memory 66 of a relatively large memory capacity is accessed for a data block at a high speed with simple control even with the software by which the same physical address should be referenced by different logical addresses.

As described hereinabove with reference to FIG. 3, a general address signal produced for each instruction has a bit pattern predetermined for that instruction at the most significant bit of the third field and the bits lower in order than that most significant bit irrespective of those logical form LAD1 or LAD2 and physical form PAD in which the general address signal under consideration is given. It is therefore possible to understand that the logical-to-physical address converter 82 translates a general address signal given in the logical form LAD1 or LAD2 for a particular instruction into a translated physical address signal for the particular instruction. The translation table 68 produces the translated physical address signal. An access to the control table 67 produces the physical address signal by which an address in the main memory 45 is accessible where a data block is stored with a copy thereof memorized in the accessed address of the buffer memory 66.

Figure 8:
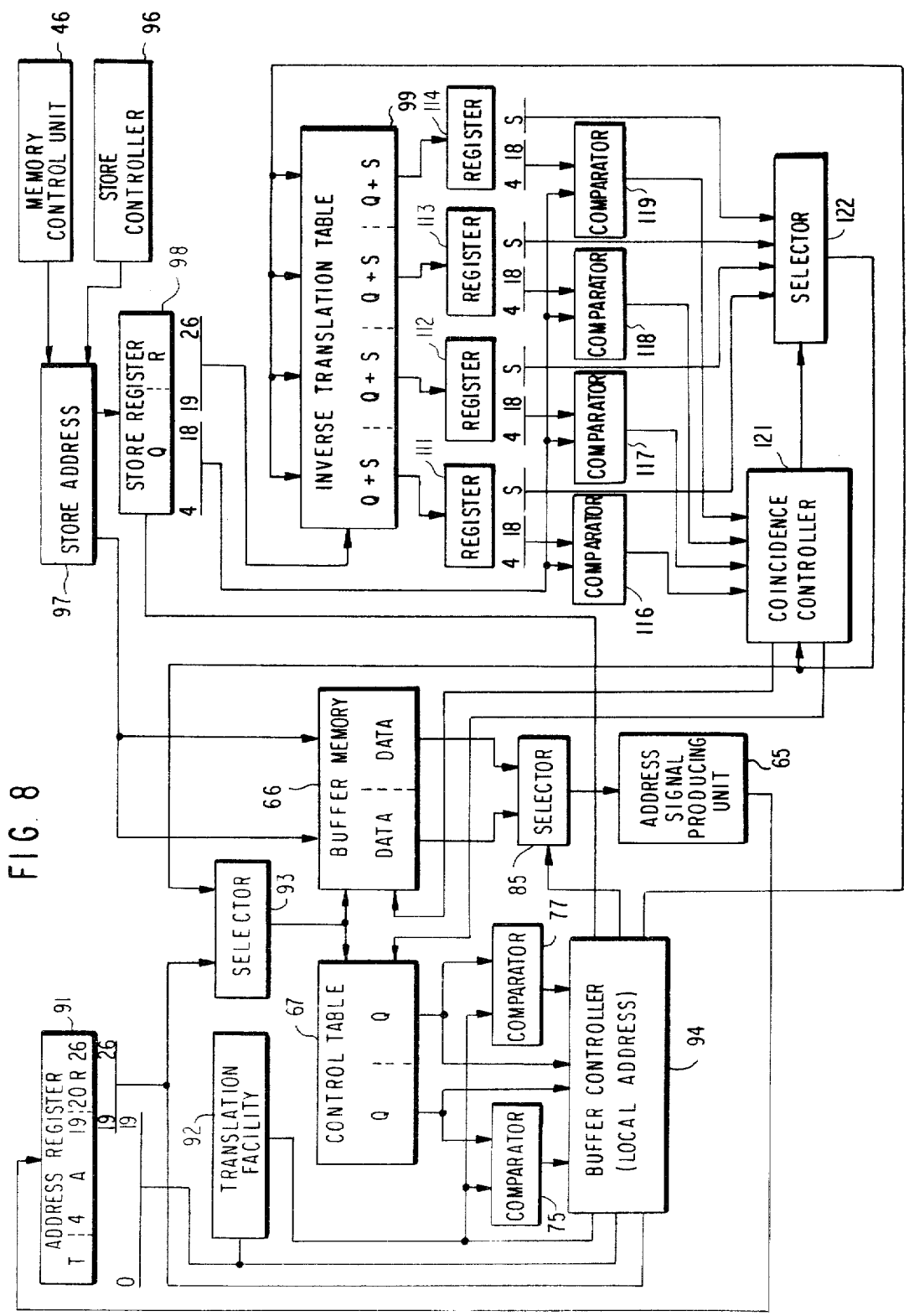
FIG. 8 shows in blocks a buffer memory system according to a second embodiment of this invention, together with a memory control unit and two structural elements of a data processor illustrated in FIG. 1.

Referring now to FIG. 8, a buffer memory system according to a second embodiment of this invention comprises similar parts designated by like reference numerals. Merely for simplicity of description, access to the translation table 67 (FIG. 2) will not be described. A modified address register 91 is therefore substituted for the address register 69 described in conjunction with FIG. 2. A translation facility 92 comprises the translation table 67, logical-to-physical address converter 82, and check information comparator 72. The buffer memory access and the control table access are carried out, not directly from the address register 91, but through an access selector 93 for the purpose which will become clear later. A buffer controller 94, to be later described in detail, controls the buffer memory selector 85 as described heretobefore in connection with the buffer controller 81 with reference to FIGS. 2 and 7. The controller 94 additionally controls a coincidence process to be described hereunder.

Figure 9:
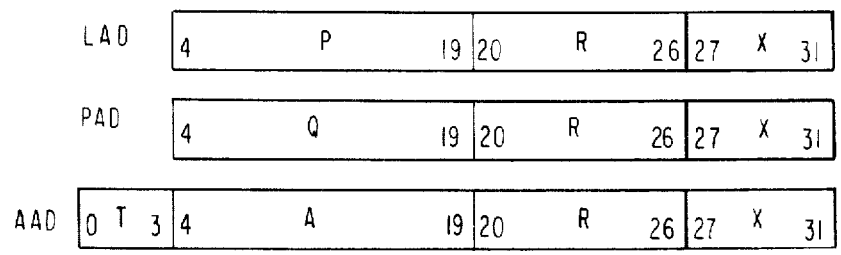
FIG. 9 shows a few address formats used in the buffer memory system depicted in FIG. 8.

Turning to FIG. 9 for a short while, the address information is given by a plurality of bits as described with reference to FIG. 3. A general address AAD comprises a type field T of the zeroth through the third bits 0 to 3 and an A field of the fourth through the ninteenth bits 4 to 19. When the general address AAD gives logical and physical addresses LAD and PAD, the A field represents a logical page field P and a physical page field Q, respectively. Each address AAD, LAD, or PAD further comprises a block field R of the twentieth through the twenty-sixth bits 20 to 26 indicative of a block address in a page and a byte field X of the twenty-seventh through the thirty-first bits 27 to 31 representative of a byte address in the block. For the buffer memory system being illustrated, the second and the third fields of the ninteenth through the twenty-sixth bits 19 to 26 are used in accessing each of the buffer memory 66 and the control table 67. The ninteenth bit 19 gives the second field and is the least significant bit of the logical or the physical page field P or Q. The third field is given by the block field R as before. Inasmuch as the first field is used merely to access the translation table 68 (FIG. 2), the second and the third fields may be called a higher and a lower order field, respectively.

Besides a physical address PAD per se, it is possible on accessing the main memory 45 to use the physical address PAD with conversion carried out either by a floating address register (not shown) or the like or by resorting to the prefix conversion known in the art. A logical address LAD gives an access by the logical page field P to a page table for the requested software and is converted to an equivalent physical address PAD by reading the physical page field Q from the accessed page table. The ninteenth bit 19 used as the second field may have different values in the logical and the physical addresses LAD and PAD for accessing one and the same data block.

Turning back to FIG. 8, an access to a requested data block is carried out in a manner similar to that described with reference to FIGS. 2 and 6. Let a general address signal AAD for reading the requested data block either from the buffer memory 66 or the main memory 45 be produced by the address signal producing unit 65 and stored in the address register 91. For the time being, the access selector 93 supplies the second and the third fields of bits 19 to 26 of the general address signal AAD directly to the buffer memory 66 and the control table 67 from the address register 91. When the general address signal AAD is given in the logical form, the translation facility 92 produces the physical page field Q of a translated physical address signal. The logical left and right comparators 75 and 77 produce, when the translated physical page field Q is in coincidence with the left or the right output signal of the control table 67, a comparison result signal indicative of the coincidence. Responsive to the selection signal produced by the buffer controller 94, the buffer memory selector 85 produces an effective one of the left and the right output signals of the buffer memory 66. The effective data block is supplied to the data processor 51 represented by the address signal producing unit 65 as before. The physical left and right comarators 76 and 78 and the comparison result selector 79 are not depicted merely for simplicity of illustration. It should be understood that the translation facility 92 merely transmits the Q field, among others, of a general address signal AAD given in the physical form and registered in the address register 91.

If the logical and the physical comparators 75 through 78 are indicative of the fact that the requested data block is not preliminarily memorized in the buffer memory 66 at the address accessed by the second and the third fields of the general address signal stored in the address register 91, the buffer controller 94 makes the memory control unit 46 swap the requested data block out of the main memory address accessed by a physical address signal which is either registered in the address register 91 or into which a logical address signal registered in the address register 91 is translated by the translation facility 92. The swapped out data block is stored in the buffer memory 66 as a copy of the data block, which remains in the accessed main memory address. The physical page field Q of the physical address signal is stored in the control table 67. The swap out may be carried out after it is confirmed that the requested data block is not present in the buffer memory 66 insofar as the general address signal given in the logical form is concerned.

The segment of the buffer memory 66 in which the copy of the data block should be stored, may be decided in compliance with a predetermined algorithm, such as the replacement algorithm known in the art. The address in the segment is decided by the second and the third fields of the general address signal stored in the address register 91. As pointed out hereinabove, the second field may have different values for the same requested data block depending on whether the general address signal is given in the logical and the physical forms. The copies of a data block may therefore be memorized at a plurality of addresses. It is now understood that the swapped out data block should be stored in the buffer memory 66 with the above-mentioned coincidence process carried out as will hereunder be described. Among others, the coincidence process insures that copies of a specific data block stored in the main memory address accessible by a physical address signal for a specific instruction should be memorized only at that or those addresses of the buffer memory 66 which are accessible by the second and the third fields of the general address signals for the specific instruction and that the physical address signal for the specific instruction should be memorized in the corresponding address or addresses of the control table 67.

It will now be assumed for clarity of description that a particular or new data block should be stored in the main memory 45 at the main memory address accessible by a particular physical address signal. A previous data block for which the particular data block is substituted in the main memory 45, will remain as a copy in the buffer memory 66 at a particular address. The copy in the particular address will no more be a copy of the particular data block. It is therefore mandatory to carry out also the coincidence process. In this event, the coincidence process is to render a copy memorized in the particular address coincident with the particular data block.

Figure 10:
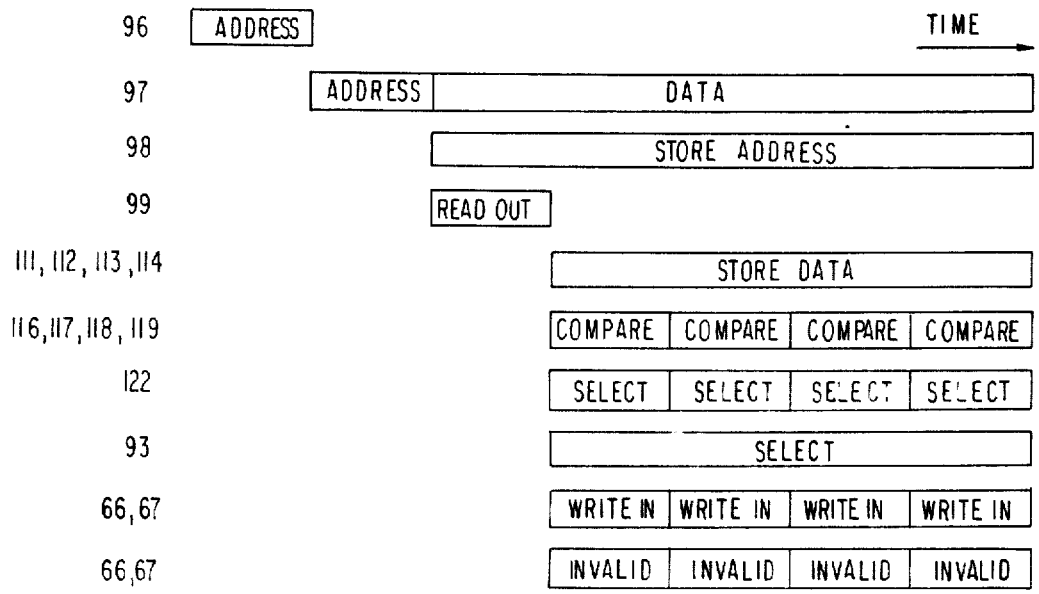
FIG. 10 is a timing chart for use in describing new data block storing operation of the buffer memory system shown in FIG. 8.

Referring to FIG. 10 in addition to FIG. 8, the buffer memory system is coupled to, besides the memory control unit 46, a store controller 96 comprised by the data processor 51. For the coincidence process, either the memory control unit 46 or the store controller 96 supplies a store instruction signal and the particular physical address signal as illustrated in FIG. 10 at "46, 96" to a store address unit 97, which will later be described. The store address unit 97 stores the particular physical address signal in a store address register 98 as shown in FIG. 10 at 97. Either the memory control unit 46 or the store controller 96 supplies the particular data block also to the store address unit 97, which delivers the particular data block to the buffer memory 66 as depicted in FIG. 10 also at 97. Among the physical address signal, the physical page field Q and the block field R are significant. The second and the third fields of bits 19 to 26 are herein referred to as a designation field S, which further comprises at least one additional bit to designate not only an address in each of the buffer memory 66 and the control table 67 but also one of the segments thereof. In the example being illustrated, the additional bit is only one in number.

The buffer memory system may comprise the physical page field selector 84 described in conjunction with FIG. 2. The selector 84 serves as means responsive to a general address signal produced by the address signal producing unit 65 for selecting a current physical address signal from a physical address signal into which a general address signal currently produced by the address signal producing unit 65 as a logical address signal is translated by the translation facility 92 and a physical address signal produced by the address signal producing unit 65 as the currently produced general address signal. The current physical address signal is given by that pertinent one of the physical address signal the currently produced logical address signal is translated into and the currently produced physical address signal which is selected according as the currently produced general address signal is given in the logical and the physical forms.

The buffer memory system being illustrated, comprises an inverse translation or conversion table 99 accessible by the second and the third fields of the particular address signal registered in the store address register 98 as illustrated in FIG. 10 at 98. As will later become clear, the inverse translation table 99 is for memorizing local address signals, which will hereunder be described more in detail, as entries thereof up to about a half of its memory capacity when the illustrated buffer memory system is stationarily operable. For the time being, each local address signal may be understood to comprise the Q field and the designation field S for a general address signal registered in the address register 91.

The memory capacity of the inverse translation table 99, namely, the number of possible entries in the inverse translation table 99, is preferably n times as many as the maximum number of entries in the control table 67, where the factor n is decided as two to the power equal to the number of that or those bits of the second field which are used in concatenation with the third field on accessing the buffer memory 66. In the illustrated example, the bit is only the ninteenth bit 19. The factor n is therefore equal to two. In order to determined the number of possible entries, it is sufficient to take the number of segments into consideration. The illustrated inverse translation table 99 therefore has first through fourth segments.

Being accessed, the entries of the inverse translation table 99 are read out of the first through the fourth segments, respectively, as indicated in FIG. 10 at 99 and stored in first through fourth registers 111, 112, 113, and 114 as illustrated in FIG. 10 at 111 through 114. First through fourth comparators 116, 117, 118, and 119 are for comparing the fourth through the eighteenth bits 4 to 18 among the physical page field Q registered in the store address register 98 with the corresponding bits 4 to 18 registered in the first through the fourth registers 111 to 114, respectively. The particular physical address signal is thereby compared with the local address signals memorized in the inverse translation table 99.

As depicted in FIG. 10 at 116 through 119, the comparators 116 through 119 successively produce comparator output signals indicative of whether the compared address signals are in identity with each other or not. The identity shows that the associated one of the registers 111 through 114 is loaded with a local address signal including a designation field S which is effective in designating that particular address in each of the buffer memory 66 and the control table 67 at which the particular data block supplied to the buffer memory 66 from the store address unit 97 and the particular physical address signal registered in the store address register 98 should be stored. One of the segments in each of the buffer memory 66 and the control table 67 is also designated.

A coincidence controller 121, to be later described, is supplied with the comparator output signals. According to the identity, the coincidence controller 121 controls an accompanying selector 122 for selecting a corresponding one of the designation fields S supplied thereto from the registers 111 through 114. The process is indicated in FIG. 10 at 122. The selected designation field S is supplied back to the coincidence controller 121 for the purpose which will later become clear. The selected designation field S is delivered also to the access selector 93 to automatically designate an address in each of the buffer memory 66 and the control table 67 by the second and the third fields of bits 19 to 26 included therewith. The process is indicated in FIG. 10 at 93. Responsive to the additional bit included in the selected designation field S, the coincidence controller 121 feeds a write selection signal to the buffer memory 66 and the control table 67 to designate one of the segments of each. The designated segment and address are for storage of the particular data block and the physical page field Q of the particular physical address signal. The process is indicated in FIG. 10 at 66 and 67 along an upper line.

As pointed out hereinabove, one and the same data block may be memorized in the buffer memory 66 at a plurality of addresses. When this applies to the requested data block, a like number of local address signals memorized in a plurality of segments of the inverse translation table 99 at an address accessible by the particular physical address signal registered in the store address register 98, are inclusive of the bits 4 to 18 identical with the corresponding bits 4 to 18 of the particular physical address signal memorized in the store address register 98. The selector 122 accompanying the inverse translation table 99 successively produces a plurality of "selected" designation fields S, which successively render the entries in each of the buffer memory 66 and the control table 67 coincident with the particular data block and physical address signal as described heretobefore.

The particular data block may carry no information in practice. The entry in that at least one address in the buffer memory 66 is invalidated or erased in this event, which is designated by the selected designation field S. This furthermore invalidates the entry in the control table 67 at the at least one corresponding address. The process is indicated in FIG. 10 at 66 and 67 along a lower line below the upper line which shows "write in" for the pertinent one or more of the segments and was referred to hereinabove.

Turning back to the description of swap out of the requested data block from the main memory 45 into the buffer memory 66 in response to the general address signal AAD, the physical address signal for accessing the main memory address for the swap out will be called a current physical address signal. The current physical address signal is the general address signal AAD when the latter is a physical address signal. The current physical address signal is one that is produced by the translation facility 92 when the general address signal AAD is a logical address signal. The buffer controller 94 supplies the current physical address signal to the store address register 98 together with a first setting signal for storing the current physical address signal in the store address register 98. It may be surmised that the requested data block is supplied to the buffer memory 66 through the store address unit 97.

The buffer controller 94 delivers a first write enable signal to the inverse translation table 99 together with a first local address signal comprising the Q field of the current physical address signal and a new designation field S which is determined by the general address signal AAD. The write enable signal specifies one of the first through the fourth segments of the inverse translation table 99 that is loaded with no information in practice. The write enable signal furthermore serves to store the first local address signal at the address accessed in the specified segment by the current physical address signal registered in the store address register 98. As described before in conjunction with storage of the particular data block in the main memory 45, the new designation field S is selected as a selected designation field S for designating a particular address in each of the buffer memory 66 and the control table 67. As described also hereinabove, the coincidence contoller 94 delivers a first write selection signal to the buffer memory 66 and the control table 67.

The requested data block is stored in the address and the segment of the buffer memory 66 according to the designation by the selected designation field S. The current physical address signal, or more particularly, the Q field thereof, is stored in the address and the segment of the control table 67 as designated by the selected designation field S. The process is indicated in FIG. 10 at 66 and 67 along the upper line.

Before storage of the current physical address signal in the particular address, a previous physical address signal memorized at the particular address, if any, is read from the control table 67 and is supplied to the buffer controller 94 directly rather than through the comparators 75 through 78 and the comparison result selector 79 (FIG. 2). The buffer controller 94 supplies the store address register 98 with a second setting signal and the previous address signal to store the latter in the store address register 98. The buffer controller 94 furthermore supplies the inverse translation table 99 with a second write enable signal and a second local address signal, which now comprises no information in effect. A previous local address signal comprising a Q field and a previous designation field S memorized under the circumstances in the address accessed in the specified segment by the previous physical address signal registered in the store address register 98, is thereby invalidated as illustrated in FIG. 10 at 66 and 67 along the lower line.

On carrying out the swap, the process is repeated if a plurality of selected designation fields S are found in a plurality of segments of the inverse translation table 99 at the address accessed by the current physical address signal. When the particular data block representative of no information is "stored" in the buffer memory 66, namely, when the entry at one or more addresses are invalidated in the buffer memory 66 with the entry at the corresponding address or addresses in the control table 67 invalidated, it is necessary that the entry in the inverse translation table 99 should also be invalidated by the "second" setting signal and others as described in connection with the swap out of a requested data block. It is now understood that the entries in the buffer memory 66 and the control table 67 are all correctly updated by the coincidence process.

Figure 11:
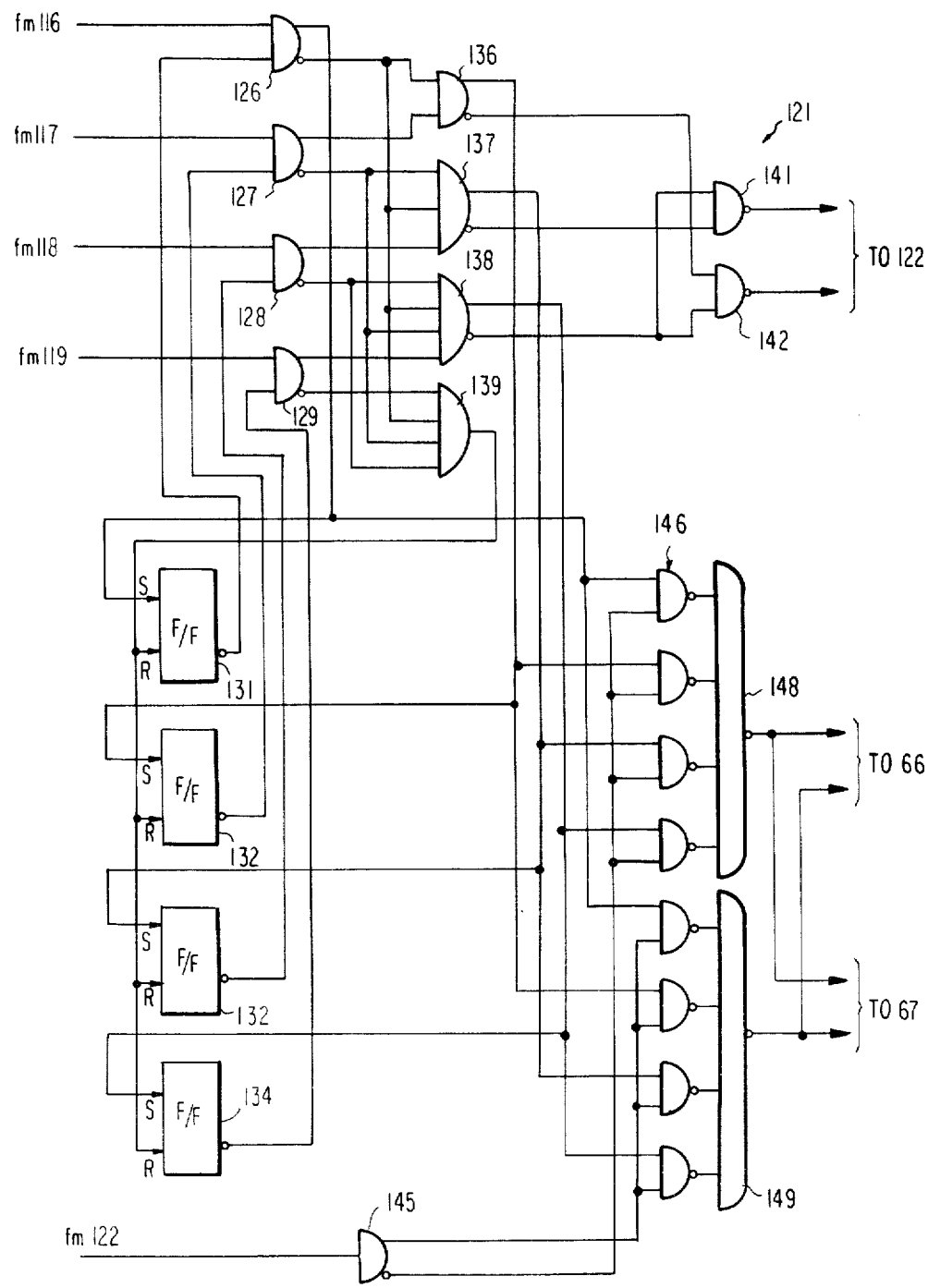
FIG. 11 is a block diagram of a coincidence controller for use in the buffer memory system depicted in FIG. 8.

Referring now to FIG. 11, the coincidence controller 121 may comprise first through fourth two-input AND gates 126, 127, 128, and 129 supplied with the comparator output signals from the first through the fourth comparators 116 to 119, respectively. The AND gates 126 through 129 are successively controlled by logic "0" complementary outputs of first through fourth flip-flops 131, 132, 133, and 134, respectively. Each of the AND gates 126 through 129, a fifth two-input AND gates 136, a three-input AND gate 137, and a first four-input AND gate 138 has a true and a complementary output terminal. The AND gates 126 through 129 and 136 through 138, a second four-input AND gate 139, the flip-flops 131 through 134, and first and second output NAND gates 141 and 142 are connected as shown. The flip-flops 131 through 134 are for indicating completion of the coincidence process carried out for the "selected" designation fields S successively produced from the first through the fourth registers 111 through 114, respectively. Timed by the flip-flops 131 through 134, the first and the second output NAND gates 141 and 142 deliver the selection signal to the accompanying selector 122.

The coincidence controller 121 may furthermore comprise a true-complementary circuit 145 supplied with the additional bit of each selected designation field S for producing a true and a complementary output signal. The circuit 145, the first and the fifth two-input AND gates 126 and 136, the three-input and the first four-input AND gates 137 and 138, control NAND gates collectively indicated at 146, and third and fourth output NAND gates 148 and 149 are connected as shown. The third and the fourth output NAND gates 148 and 149 are for supplying the first and the second write selection signals to the buffer memory 66 and the control table 67 for each designation field S.

Figure 12:
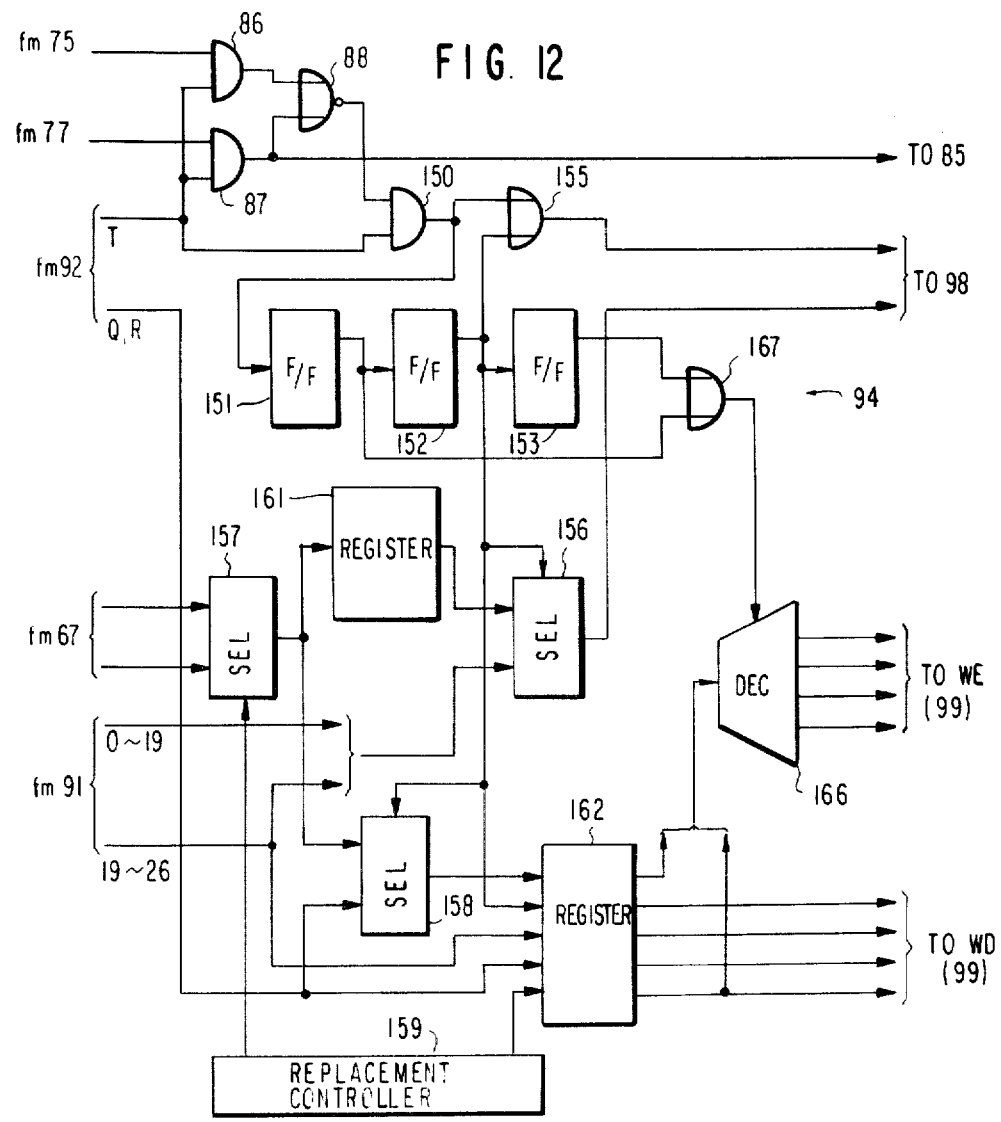
FIG. 12 is a block diagram of a buffer control unit for use in the buffer memory system illustrated in FIG. 8.

Turning to FIG. 12, the buffer controller 94 may comprise first and second two-input AND gates 86 and 87 and a NOR gate 88 equivalent to the corresponding elements 86 through 88 described with reference to FIG. 7. When a requested data block should be swapped out of the main memory 45 into the buffer memory 66, the gates 86 through 88 and a third two-input AND gate 150 are put into cooperation to successively drive first through third flip-flops 151, 152, and 153. The first through the third flip-flops 151 to 153 are for producing a first reset or set output, a second reset or set output, and a third set output, respectively. At first, the output of the third AND gate 150 is delivered to the store address register 98 as the above-mentioned first setting signal through an output OR gate 155.

A first selector 156 is supplied with the Q and the R fields of the above-described current physical address signal as one of two inputs from the translation facility 92. The current physical address signal is either that registered in the address register 91 or one into which a logical address signal registered therein is translated by the translation facility 92. Being common to a general address signal AAD given in either of the logical and the physical forms for one and the same instruction, the R field may be supplied directly from the address register 91. The first selector 156 produces a first selector output signal as will presently become clear. A second selector 157 is supplied with the left and the right output signals of the control table 67. One of the left and the right output signals is selected as a second selector output signal, which provides the above-described previous physical address signal, or more specifically, the Q field thereof, as will shortly become clear. The second selector output signal is delivered to a third selector 158 as one of two inputs. The Q field of the current physical address signal is supplied to the third selector 158 as the other input. The third selector 158 produces a third selector output signal. A replacement controller 159 is a wired logic for producing a replacement signal in compliance with the above-mentioned replacement algorithm for the buffer memory 66. One of the left and the right output signals is selected as the second selector output signal by the replacement signal. The selected previous physical address signal is supplied to a first register 161 and retained therein. The previous physical address signal is delivered also to the first selector 156 through the first register 161 as the other input. A second register 162 is supplied with the third selector output signal, the replacement signal, the second and the third fields of bits 19 to 26 from the address register 91, and the second reset or set output signal.

At the instant at which the first setting signal is delivered to the store address register 98, the first selector 156 selects the Q and the R fields of the current physical address signal. The current physical address signal is thus stored in the store address register 98. Responsive to the second reset output, the third selector 158 selects the Q field of the current physical address signal. The second register 162 delivers the third selector output signal and the replacement signal to a decoder 166. The second register 162 furthermore supplies the inverse translation table 99 with the afore-mentioned first local address signal, which comprises the Q field of the current physical address signal and a designation field S comprising the second and the third fields of the current general address signal AAD and the replacement signal. The second reset output provides the validity bit of the type described in the above-referenced Alvarez et al patent. Immediately thereafter, the first set output is delivered to the decoder 166 as a control signal through a control OR gate 167. The decoder 166 supplies the inverse translation table 99 with the above-described first write enable signal.

In timed relation to operation in the coincidence controller 121 exemplified with reference to FIG. 11 and accordingly the storage of either the requested of the particular data block in the buffer memory 66, the second set output is supplied to the store address register 98 as the above-described second setting signal through the output OR gate 155. The second set output makes the first selector 156 select the selected one of the left and the right output signals of the control table 67. The first selector output signal provides the previous physical address signal. For this purpose, it should be understood that the third field included in the selected designation field S and supplied to the control table 67 in accessing an address, is also supplied to the first selector 156. The Q and the R fields of the previous physical address signal is now stored in the store address register 98. The second set output furthermore makes the third selector 158 select the Q field of the previous physical address signal. The second register 162 delivers the last-mentioned Q field and the replacement signal to the decoder 166. The third set output is supplied also to the decoder 166 to make the latter deliver the second write enable signal, described hereinabove, to the inverse translation table 99. The second register 162 supplies the inverse translation table 99 with the above-described second local address signal comprising no information except for the validity bit, which is now changed from logic "1" to logic "0" by the second set output.

Figure 13:
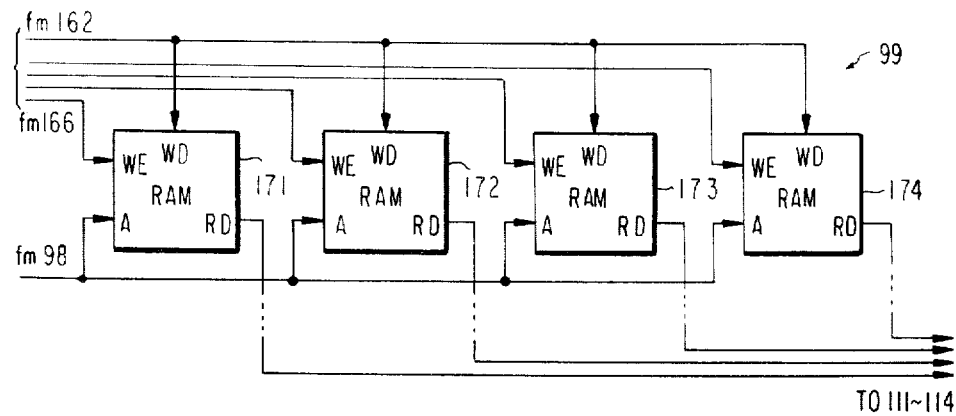
FIG. 13 is a block diagram of an inverse translation table for use in the buffer memory system shown in FIG. 8.

Turning further to FIG. 13, an address or row of the inverse translation table 99 may comprise first through fourth random-access memories 171, 172, 173, and 174 in the first through the fourth segments, respectively. Each random-access memory has an address terminal A, a write enable terminal WE, a write-in data terminal WD, and a data read-out terminal RD. Supplied at the address terminals A with the second and the third fields of the particular, the current, or the previous physical address signal registered in the store address register 98, the random-access memories, such as 171 through 174, of the accessed address usually deliver the local address signals memorized therein to the first through the fourth registers 111 to 114 from the respective data read-out terminals RD.

When either the first or the second write enable signal is supplied from the buffer controller 94 to the write enable terminal of a specific one of the random-access memories, such as 171 through 174, of the address accessed by the second and the third fields of the current physical address signal or of the particular or the previous physical address signal registered in the store address register 98, the first or the second local address signal supplied to the random-access memories of the table 99 also from the buffer controller 94 is stored in the specific random-access memory. Only at this instant, the read out is inhibited.

Figure 14:
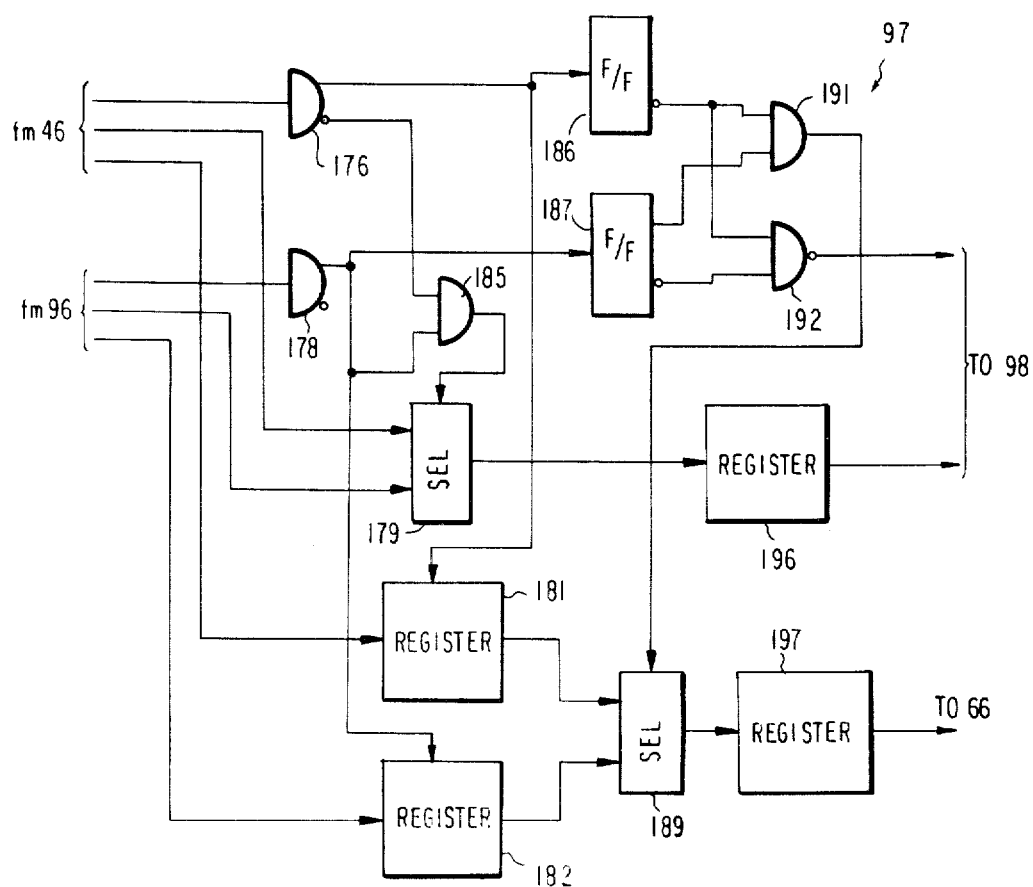
FIG. 14 is a block diagram of a store address unit for use in the buffer memory system depicted in FIG. 8.

Finally referring to FIG. 14, the store address unit 97 may comprise first and second true-complementary circuits 176 and 177 supplied with the store instruction signal from the memory control unit 46 and the store controller 96, respectively. The particular physical address signal is supplied to an address selector 179 as two inputs thereof from the units 46 and 96, respectively. The particular data block is likewise delivered to first and second input registers 181 and 182 controlled by the true output signals of the first and the second true-complementary circuits 176 and 177, respectively. The complementary output signals of the true-complementary circuits 176 and 177 are fed to an address control AND gate 185 for controlling the selector 179. The true output signals are fed also to first and second flip-flops 186 and 187, which control a data block control AND gate 191 for controlling a data block selector 189 supplied from the registers 181 and 182. The flip-flops 186 and 187 furthermore control an output NAD gate 192 for supplying the store address register 98 with a setting signal of the type described in connection with the first and the second setting signals. The address selector 179 delivers the particular physical address signal to a first output register 196 and thence to the store address register 98. The data block selected by the data block selector 189 is delivered to the buffer memory 66 after once registered in a second output register 197.

While only two embodiments of this invention have thus far been described together with a few modifications thereof, it will now be readily feasible for one skilled in the art to carry this invention into effect in various other manners. For example, each of the buffer memory 66 and the control table 67 may have a different number of segments. The buffer controller 81 or 94 may be implemented in a manner other than that described with reference to FIGS. 7 and 12. The logical address signals LAD1, LAD2, and LAD and the physical address signal PAD may have address formats other than those described in conjunction with FIGS. 3 and 9. This applies to the designation field S. The inverse translation table 99 may not have the memory capacity equal to or larger than n times as many as the maximum number of entries in the control table 67 but a smaller memory capacity determined in consideration of the probability of overflow of the table 99 and the bulkiness thereof. The coincidence process for swap out of a requested data block may be carried out in the reversed order, namely, for the previous physical address signal first and for the particular physical address signal thereafter. The designation field S may be used to access only one of the buffer memory 66 and the control table 67. "Each" instruction, a particular instruction, or a similar instruction as called throughout the instant specification may be an instruction concerned only with the address information.

What is claimed is:

1. A buffer memory system for use in a data processing system comprising a main memory and address signal producing means for producing a general address signal given in one of logical and physical forms for each of a plurality of instructions for accessing said main memory and comprising a first, a second and a third field at higher order bits, at least one intermediate bit, and lower order bits, respectively, the general address signal given in the logical form for one of said instructions having a logical page field for specifying one of a plurality of pages, the general address signal given in the physical form for said one instruction having a physical page field for specifying said one page, each of said logical and said physical page fields comprising the first and the second fields, the third field of a general address signal comprising each of said logical and said physical page fields being for specifying one of a plurality of block addresses in said one page, said main memory having main memory addresses for storing a data block at the main memory address accessible by the page and the block address specified by a general address signal given in the physical form, said buffer memory system comprising:

address translating means for translating the logical page field of a general address signal given for each instruction to the physical page field of a general address signal given for the instruction under consideration;

translation table means having translation table addresses, each accessible by the first and the second fields of a general address signal given in either of the logical and the physical forms for a particular instruction for memorizing the physical page field of a general address signal given in the physical form for said particular instruction;

buffer memory means having buffer memory addresses, each accessible by the second and the third fields of a general address signal given in either of the logical and the physical forms for a specific instruction for memorizing a copy of the data block stored in the main memory address accessible by the page and the block address specified by a general address signal given in the physical form for said specific instruction;

control table means having control table addresses, each accessible by the second and the third fields of a general address signal given in either of the logical and the physical forms for said specific instruction for memorizing the physical page field of the general address signal given in the physical form for said specific instruction;

first means responsive to the first and the second fields of a general address signal currently produced by said address signal producing means in either of the logical and the physical forms for reading the physical page field from said translation table means and responsive to the second and the third fields of the currently produced general address signal for reading the data block from said buffer memory means and the physical page field from said control table means;

second means having inputs responsive to the outputs of said translation table means and control table means and the physical page field of the currently produced general address signal for comparing one of the physical page field of the currently produced general address signal and the physical page field read from said translation table means with the physical page field read from said control table means to produce a comparison result signal indicative of whether the compared physical page fields are in coincidence of incoincidence with each other;

third means responsive to the comparison result signal produced by said second means for judging that the data block read from said buffer memory means is effective only when the comparison result signal is indicative of the coincidence;

fourth means responsive to the comparison result signal indicative of the incoincidence for reading the data block from the main memory address accessible by the third field of the currently produced general address signal and that pertinent one of the physical page fields read from said translation table means and of the currently produced general address signal according to whether the currently produced general address signal is given in the logical form or the physical form; and fifth means for making the buffer memory address, accessible by the second and the third fields of the currently produced general address signal, memorize the data block read from said main memory and for making the control table address, accessible by the second and the third fields of the currently produced general address signal, memorize said pertinent one of the physical page fields.

2. A buffer memory system for use in a data processing system comprising a main memory and address signal producing means for producing a general address signal given in one of logical and physical forms as a logical and a physical address signal for each of a plurality of instructions for accessing said main memory and comprising a first, a second, and a third field at higher order bits, at least one intermediate bit, and lower order bits, respectively, the logical and the physical address signals produced for an instruction having a predetermined bit pattern at the most significant bit of the third field and the bits lower in order than said most significant bit, said main memory having main memory addresses for storing a data block at the main memory address accessible by a physical address signal, said buffer memory system comprising:

address translating means for translating a logical address signal given for each instruction to a physical address signal given for the instruction under consideration;

translation table means having translation table addresses, each accessible by the first and the second fields of a general address signal given in either of the logical and the physical forms for a particular instruction for memorizing a physical address signal given for said particular instruction;

buffer memory means having buffer memory addresses, each accessible by the second and the third fields of a general address signal given in either of the logical and the physical forms for a specific instruction for memorizing a copy of the data block stored in the main memory address accessible by a physical address signal given for said specific instruction;

control table means having control table addresses, each accessible by the second and the third fields of the general address signal given in either of the logical and the physical forms for said specific instruction for memorizing the physical address signal given for said specific instruction;

first means responsive to the first and the second fields of a general address signal currently produced by said address signal producing means in either of the logical and the physical forms for a current instruction for reading out of said translation table means a physical address signal given for said current instruction and responsive to the second and the third fields of the currently produced general address signal for reading a data block from said buffer memory means and for reading out of said control table means a physical address signal by which the main memory address storing the data block read from said buffer memory is accessible;

second means having inputs responsive to the outputs of the control table means and said translation table means and the physical page field of the currently produced general address signal for comparing the physical address signal read out of said control table means with a current physical address signal given by that pertinent one of the physical address signal read out of said translation table means and a physical address signal produced as the currently produced general address signal according to whether the currently produced general address signal is give in the logical form or the physical form, said second means producing a comparison result signal indicative of whether the compared physical address signals are in coincidence or incoincidence with each other;

third means responsive to the comparison result signal produced by said second means and indicative of the coincidence for judging that the data block read from said buffer memory means is effective;

fourth means responsive to the comparison result signal produced by said second means and indicative of the incoincidence for reading a requested data block from the main memory address accessible by the current physical address signal; and fifth means for making the buffer memory address, accessible by the second and the third fields of the currently produced general address signal, memorize the requested data block and for making the control table address, accessible by the second and the third fields of the currently produced general address signal memorize the current physical address signal.

3. A buffer memory system as claimed in claim 2, wherein said fifth means comprises:

means for making the buffer memory address accessible by the second and the third fields of the currently produced general address signal memorize the requested data block;

selecting means responsive to the currently produced general address signal for selecting the current physical address signal; and means for making the control table address accessible by the second and the third fields of the currently produced general address signal memorize the current physical address signal selected by said selecting means.

4. A buffer memory system as claimed in claim 2, wherein said fifth means comprises:

inverse converting means for converting the current physical address signal to a local address signal comprising a designation field for designating one each of said buffer memory addresses and said control table addresses, the control table address designated by said designation field memorizing an earlier physical address signal given by that pertinent one of a physical address signal read out of said translation table means by said first means in response to the first and the second fields of an earlier general address signal produced in the logical form by said address signal producing means earlier than the currently produced general address signal and a physical address signal produced as the earlier general address signal by said address signal producing means which is decided according as the earlier general address signal is given in the logical and the physical forms;

means for making the buffer memory address designated by said designation field memorize the requested data block; and means for substituting the current physical address signal for the earlier physical address signal in the control table address designated by said designation field.

5. A buffer memory system for use in a data processing system comprising a main memory and address signal producing means for producing a general address signal given in one of logical and physical forms as a logical and a physical address signal for each of a plurality of instructions for accessing said main memory and comprising a higher order and a lower order field, the logical and the physical address signals produced for an instruction having a predetermined bit pattern at the most significant bit of the lower order field and the bits lower in order than said most significant bit, said main memory having main memory addresses for storing a data block at the main memory address accessible by a physical address signal, said buffer memory system comprising:

translating means for translating a logical address signal given for each instruction to a physical address signal given for the instruction under consideration;

buffer memory means having buffer memory addresses, each accessible by the higher and the lower order fields of a general address signal given in either of the logical and the physical forms for a specific instruction, for memorizing a copy of the data block stored in the main memory address accessible by a physical address signal given for said specific instruction;

control table means having control table addresses, each accessible by the higher and the lower order fields of the general address signal given in either of the logical and the physical forms for said specific instruction, for memorizing the physical address signal given for said specific instruction;

first means, responsive to the higher and the lower order fields of a general address signal currently produced by said address signal producing means in either of the logical and the physical forms, for reading a data block from said buffer memory means and for reading out of said control table means a physical address signal by which the main memory address storing the data block read from said buffer memory means is accessible;

second means for comparing the physical address signal read out of said control table means with a current physical address signal given by that pertinent one of the current physical address signals given by said translating means and a physical address signal produced as the currently produced general address signal according to whether the currently produced general address signal is given in the logical form or the physical form, said second means producing a comparison result signal indicative of whether the compared physical address signals are in coincidence or incoincidence with each other;

third means responsive to the comparison result signal produced by said second means indicative of the coincidence for judging that the data block read from said buffer memory means is effective fourth means responsive to the comparison result signal produced by said second means and indicative of the incoincidence for reading a requested data block from the main memory address accessible by the current physical address signal; and fifth means for making the buffer memory address, accessible by the higher and the lower order fields of the currently produced general address signal, memorize the requested data block and for making the control table address, accessible by the higher and the lower order fields of the currenlty produced general address signal, memorize the current physical address signal.

6. A buffer memory system as claimed in claim 5, wherein said fifth means comprises:

means for making the buffer memory address accessible by the higher and the lower order fields of the currently produced general address signal memorize the requested data block;

selecting means for selecting the current physical address signal; and means for making the control table address accessible by the higher and the lower order fields of the currently produced general address signal memorize the current physical address signal selected by said selecting means.

7. A buffer memory system as claimed in claim 5, wherein said fifth means comprises:

inverse converting means for converting the current physical address signal to a local address signal comprising a designation field for designating one each of said buffer memory addresses and said control table addresses, the control table address designated by said designation field memorizing an earlier physical address signal given by that pertinent one of a physical address signal an earlier general address signal produced in the logical form by said address signal producing means earlier than the currently produced general address signal is translated into and a physical address signal produced as the earlier general address signal by said address signal producing means which is decided according as the earlier address signal is given in the logical and the physical forms;

means for making the buffer memory address designated by said designation field memorize the requested data block; and means for substituting the current physical address signal for the earlier physical address signal in the control table address designated by said designation field.

8. A buffer memory system as claimed in claim 7, said data processing system further comprising means responsive to a particular physical address signal for storing a particular data block at the main memory address accessible by said particular physical address signal, said control table means memorizing said particular physical address signal at the control table address designated by the designation field of a particular local address signal, said buffer memory system further comprising:

first additional means responsive to said particular physical address signal for making said inverse converting means convert said particular physical address signal to said particular local address signal; and second additional means for storing said particular data block in the buffer memory address designated by the designation field of said particular local address signal.

9. A buffer memory system as claimed in claims 7 or 8, wherein said inverse converting means comprises:

local address signal generating means responsive to an accessing general address signal produced by said address signal producing means to access the requested data block for generating a specific local address signal which comprises the higher and the lower order fields of a specific physical address signal for accessing the requested data block and a designation field comprising the higher and the lower order fields of the accessing general address signal; and inverse conversion table means having inverse conversion table addresses, each accessible by the higher and the lower order fields of the specific physical address signal for memorizing the specific local address signal.

* * * * *

UNITED STATES PATENT AND TRADEMARK OFFICE
CERTIFICATE OF CORRECTION

PATENT NO. : 4,482,952
DATED : Nov. 13, 1984
INVENTOR(S) : Akagi

It is certified that error appears in the above-identified patent and that said Letters Patent is hereby corrected as shown below:

<u>IN THE SPECIFICATION:</u>

Column 4, line 31, after "which will" insert --be--.

Column 6, line 24, change "incitavie" to --indicative--.

Column 12, line 29, change "comarators" to --comparators--.

Column 14, line 21, change "determined" to --determine--.

Column 19, line 26, change "NAD" to --NAND--.

Signed and Sealed this

Twelfth Day of November 1985

[SEAL]

Attest:

Attesting Officer

DONALD J. QUIGG

Commissioner of Patents and Trademarks